(12) United States Patent  
Kanda

(10) Patent No.: US 6,600,280 B2
(45) Date of Patent: Jul. 29, 2003

(54) ELECTRIC POWER STEERING SYSTEM

(75) Inventor: Koji Kanda, Kyoto (JP)

(73) Assignee: Koyo Seiko Co, Ltd., Osaka (JP)

(*) Notice: Subject to any disclaimer, the term of this patent is extended or adjusted under 35 U.S.C. 154(b) by 0 days.

(21) Appl. No.: 09/987,734

(22) Filed: Nov. 15, 2001

(65) Prior Publication Data
US 2002/0063543 A1 May 30, 2002

(30) Foreign Application Priority Data
Nov. 29, 2000 (JP) ..................... 2000-363121

(51) Int. Cl.⁷ .............. H02K 17/32; H02K 23/68; H02K 27/30; H02P 7/00; H02P 7/04
(52) U.S. Cl. .............. 318/433; 318/432; 318/632; 318/648
(58) Field of Search .............. 318/632, 648, 318/432, 433, 434, 488, 489, 446

(56) References Cited

U.S. PATENT DOCUMENTS

| | | |
|---|---|---|
| 5,729,107 A | 3/1998 | Shimizu et al. |
| 5,904,223 A | 5/1999 | Shimizu et al. |
| 5,907,277 A * | 5/1999 | Tokunaga ............ 318/489 |
| 5,996,724 A | 12/1999 | Shimizu et al. |
| 6,161,068 A * | 12/2000 | Kurishige et al. ...... 318/432 |

* cited by examiner

Primary Examiner—Marlon T. Fletcher
(74) Attorney, Agent, or Firm—Rabin & Berdo, P.C.

(57) ABSTRACT

An electric power steering system is provided which employs an electric motor as a driving source to apply a steering assist force to a steering mechanism. The system includes: an operation degree detecting section for detecting an operation degree of an operation member; a motor current detecting section for detecting an electric current flowing through the electric motor; and a steering angle detecting section for detecting a steering angle of the steering mechanism. A reaction force from a road surface is computed on the basis of outputs of the operation degree detecting section, the motor current detecting section and the steering angle detecting section, and a driving target value of the electric motor is determined on the basis of the reaction force and the operation degree of the operation member.

5 Claims, 1 Drawing Sheet

ELECTRIC POWER STEERING SYSTEM

BACKGROUND OF THE INVENTION

1. Field of the Invention

The present invention relates to an electric power steering system which performs a steering assist operation by transmitting a torque generated by an electric motor to a steering mechanism.

2. Description of Related Art

Electric power steering systems are conventionally utilized which assist a driver's steering operation by transmitting a torque generated by an electric motor to a steering mechanism. The electric motor is controlled on the basis of a vehicle speed and a steering torque applied to a steering wheel. That is, a target electric current value of the electric motor is set greater as the steering torque increases, and set smaller as the vehicle speed increases. A vehicle speed responsive control operation is performed to variably set the target electric current value of the electric motor in accordance with the vehicle speed, whereby the driver can properly perform the steering operation while feeling a moderate road surface reaction force in any vehicle speed ranges.

However, the vehicle speed responsive control requires an input interface for sampling a signal from a vehicle speed sensor. This is one cause of the cost increase of the electric power steering system.

Since the road surface reaction force varies depending not only on the vehicle speed but also on road surface conditions and vehicle traveling conditions (e.g., slalom traveling and lane change), the vehicle speed responsive control does not always ensure a proper steering assist operation. Where the friction coefficient of a road surface is extremely low, for example, a good steering feeling cannot be provided depending on situation.

SUMMARY OF THE INVENTION

It is an object of the present invention to provide an electric power steering system which is capable of properly performing a steering assist operation without the use of vehicle speed information.

The present invention is directed to an electric power steering system which employs an electric motor as a driving source to apply a steering assist force to a steering mechanism. The electric power steering system comprises: an operation degree detecting section for detecting an operation degree of an operation member for steering; a motor current detecting section for detecting an electric current flowing through the electric motor; a steering angle detecting section for detecting a steering angle of the steering mechanism; a reaction force computing section for computing a reaction force from a road surface on the basis of outputs of the operation degree detecting section, the motor current detecting section and the steering angle detecting section; a target value setting section for determining a driving target value for driving the electric motor on the basis of the operation degree detected by the operation degree detecting section and the reaction force computed by the reaction force computing section; and a motor controlling section for controlling the electric motor for driving thereof on the basis of the driving target value determined by the target value setting section and the output of the motor current detecting section.

According to the present invention, the reaction force from the road surface is computed on the basis of the operation degree of the operation member (e.g., a steering torque), the motor current and the steering angle. The driving target value of the electric motor is determined with reference to the road surface reaction force thus computed.

Where the driving target value is determined on the basis of vehicle speed information, no consideration is given to road surface conditions (e.g., friction coefficient and the like). Where the driving target value is determined on the basis of the reaction force from the road surface, on the contrary, a steering assist operation can properly be performed in accordance with the road surface conditions, traveling conditions and the like. This improves a steering feeling.

The operation degree detecting section may be a torque sensor for detecting a steering torque applied to the operation member (e.g., a steering wheel).

Where the steering mechanism is constructed such that a pinion fixed to a steering shaft is meshed with a rack displaceable transversely of a motor vehicle, the steering angle detecting section may be a rotation angle sensor for detecting a rotation angle of the pinion or may be a rack displacement detecting mechanism for detecting a displacement degree of the rack.

The electric power steering system preferably further comprises a road surface reaction force adjusting section for setting a degree of contribution of the reaction force computed by the reaction force computing section to the driving target value to adjust a magnitude of the road surface reaction force to be received by a driver from the operation member.

With this arrangement, a steering feeling can be adjusted to suit a driver's preference by adjusting the magnitude of the road surface reaction force.

The road surface reaction force adjusting section nay comprise a setting operation member to be operated by the driver, and a filtering section having a band pass characteristic to be adjusted by the operation of the setting operation member for selectively passing outputs of the reaction force computing section. A gain adjusting section for adjusting an output gain of the reaction force computing section may be provided in addition to the filtering section or instead of the filtering section.

The foregoing and other objects, features and effects of the present invention will become more apparent from the following description of the preferred embodiments with reference to the attached drawings.

DESCRIPTION OF THE PREFERRED EMBODIMENTS

Figure 1:
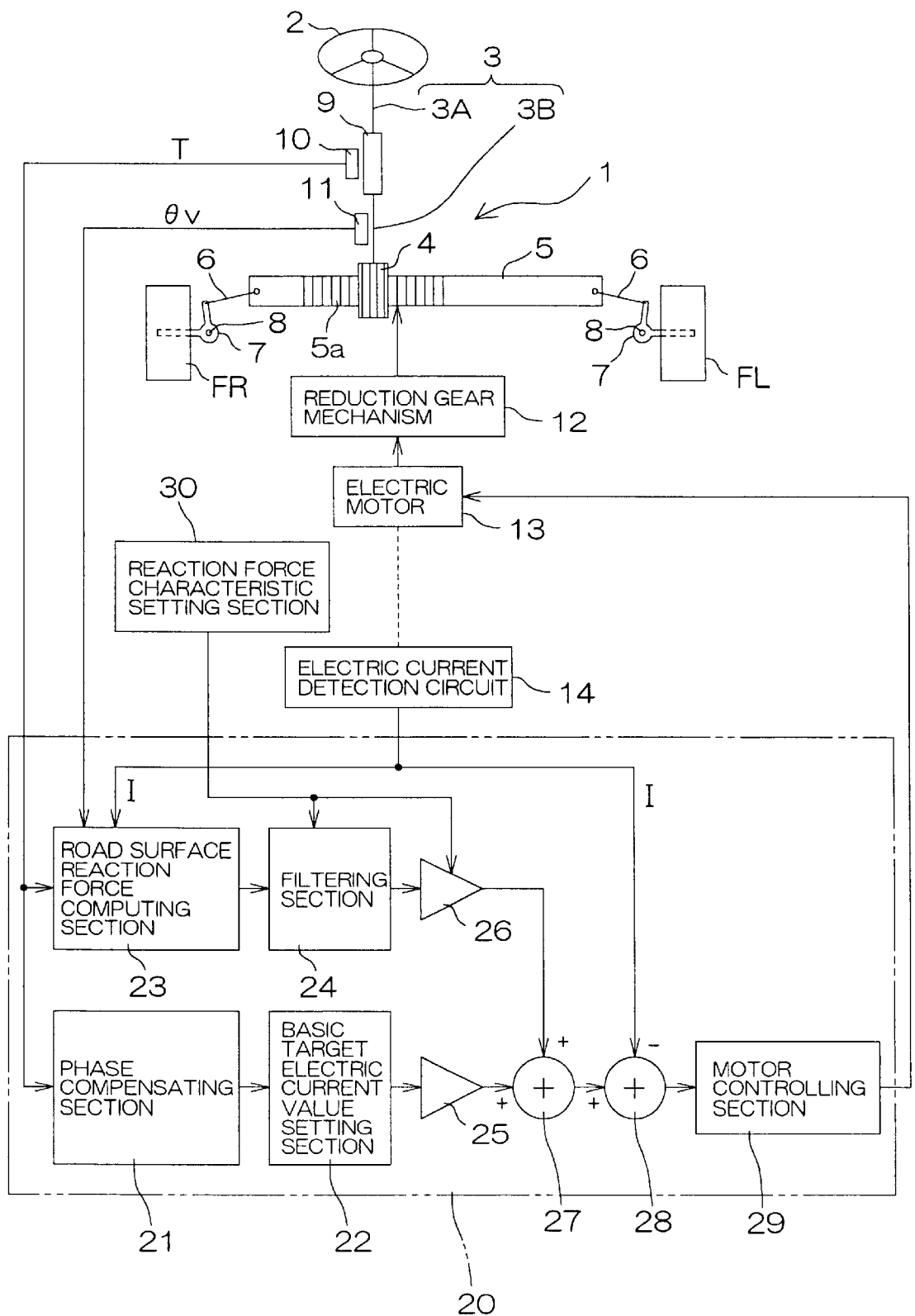
FIG. 1 is a conceptual diagram illustrating the basic construction of an electric power steering system according to one embodiment of the present invention.

FIG. 1 is a conceptual diagram illustrating the basic construction of an electric power steering system according to one embodiment of the present invention. The power steering system is provided in association with a steering mechanism 1 of a motor vehicle for applying a steering assist force to the steering mechanism 1.

The steering mechanism 1 includes a steering wheel (operation member) 2 to be operated by a driver, a steering shaft 3 coupled to the steering wheel 2, a pinion 4 provided at a distal end of the steering shaft 3, and a rack shaft 5 having a rack gear 5a meshed with the pinion 4 and extending transversely of the motor vehicle (along the width of the motor vehicle). Tie rods 6 are connected to opposite ends of the rack shaft 5, and further connected to knuckle arms 7 which respectively support left and right front wheels FL and FR as steerable vehicle wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion 4 and the rack shaft 5. The linear motion is converted into rotational motions of the knuckle arms 7 about the king pins 8, thereby achieving the steering of the left and right front wheels FL, FR.

The steering shaft 3 is split into an input shaft 3A coupled to the steering wheel 2 and an output shaft 3B coupled to the pinion 4. The input shaft 3A and the output shaft 3B are connected by a torsion bar 9 which is adapted to be twisted in accordance with the direction and magnitude of a steering torque applied to the steering wheel 2. A torque sensor 10 for detecting the direction and magnitude of the steering torque by detecting a relative angular displacement between the input shaft 3A and the output shaft 3B is provided in association with the torsion bar 9. A steering angle sensor 11 for detecting a steering angle of the steering mechanism 1 by detecting a rotation angle of the output shaft 3B is provided in association with the output shaft 3B.

An electric motor 13 is connected to the output shaft 3B or the rack shaft 5 via a reduction gear mechanism 12. That is, a torque generated by the electric motor 13 is reduced at a predetermined reduction ratio by the reduction gear mechanism 12, and transmitted as a steering assist force to the steering mechanism 1. An electric current detection circuit 14 for detecting an electric current actually flowing through the electric motor 13 (motor current) is provided in association with the electric motor 13.

The electric motor 13 is controlled by an electronic control unit (ECU) 20. The electronic control unit 20 determines a target electric current value of the electric motor 13 on the basis of the steering torque T detected by the torque sensor 10 and the output shaft rotation angle $\theta_v$ detected by the steering angle sensor 11. The electronic control unit 20 feedback-controls the electric motor 13 to achieve the target electric current value with reference to an output signal of the electric current detection circuit 14.

The electronic control unit 20 includes: a phase compensating section 21 which receives a torque signal outputted from the torque sensor 10 and advances the phase of the signal for stabilization of the system; a basic target electric current value setting section 22 for determining a basic target electric current value on the basis of the steering torque T outputted from the phase compensating section 21 in accordance with the direction and magnitude of the steering torque T; a road surface reaction force computing section 23 for computing a road surface reaction force transmitted to the steering mechanism 1 via the vehicle wheels FL, FR from a road surface on which the motor vehicle is currently traveling, on the basis of the steering torque T, the output shaft rotation angle $\theta_v$ and the motor current I; and a filtering section 24 for performing a filtering process on the road surface reaction force computed by the road surface reaction force computing section 23. The basic target electric current value determined by the basic target electric current value setting section 22 and a road surface reaction force value outputted from the filtering section 24 are multiplied by appropriate gains by amplifiers 25 and 26, respectively, and added to each other by an adder 27. An output of the adder 27 is applied as a target electric current value of the electric motor 13 to a subtracter 28.

The subtracter 28 determines a difference between the target electric current value applied from the adder 27 and the motor current I detected by the electric current detection circuit 14, and applies the difference to a motor controlling section 29. The motor controlling section 29 may include, for example, a PI controlling section for performing a PI (proportional integration) control computation, a duty setting section for determining a duty factor for a PWM (pulse width modulation) control on the basis of an output of the PI controlling section, and a pulse width controlling section for generating a pulse width driving signal having the duty factor determined by the duty setting section.

A command signal from a reaction force characteristic setting section 30 is applied to the filtering section 24 and the amplifier 26. The reaction force characteristic setting section 30 includes a setting operation member such as a switch operable by the driver. By operating the setting operation member, a band pass characteristic of the filtering section 24 is selected from a plurality of band pass characteristics including, for example, a high frequency band pass characteristic, a low frequency band pass characteristic and an intermediate frequency band pass characteristic. By operating the setting operation member, an output gain of the road surface reaction force computing section 23 (a contribution degree to the target electric current value) can variably be set to increase or decrease a magnitude of the road surface reaction force to be received by the driver from the steering wheel 2.

The electronic control unit 20 comprises a microprocessor, which executes programs stored in a storage medium such as a program ROM to perform all or part of functions of the phase compensating section 21, the basic target electric current value setting section 22, the road surface reaction force computing section 23, the filtering section 24, the amplifiers 25, 26, the adder 27, the subtracter 28 and the motor controlling section 29.

The road surface reaction force computing section 23 computes the road surface reaction force F in accordance with the following expression (1):

$$F=1/r\{T+n\cdot K_{trg}\cdot I-J\cdot \theta_v''-C_V\cdot \theta_v'-n\cdot C_{mo}\cdot \theta_{mo}'-r\cdot C_r'\} \qquad (1)$$

wherein $\theta_{mo}'=n\cdot\theta_v'$, $x'=r\cdot\theta_v'$, $J=J_V+n^2 J_{mo}+m\cdot r^2$, r is the radius of the pinion 4, n is the reduction ratio of the reduction gear mechanism 12, $K_{trg}$ is a motor torque constant, J is an equivalent inertial moment on an output shaft side, x is the displacement of the rack shaft 5, x' is a time-based first-order differential value of the displacement of the rack shaft 5, m is the mass of the rack shaft 5, $J_V$ is an inertial moment of the output shaft, $J_{mo}$ is an inertial moment of the motor, $C_V$ is a friction coefficient of the output shaft 3B, $C_{mo}$ is a friction coefficient of the electric motor 13, $C_r$ is a friction coefficient of the rack shaft 5, $\theta_v'$ is a time-based first-order differential value of the output shaft rotation angle $\theta_V$, $\theta_v''$ is a time-based second-order differential value of the output shaft rotation angle $\theta_V$, and $\theta_{mo}'$ is a time-based first-order differential value of the motor rotation angle $\theta_{mo}$.

Thus, the road surface reaction force computing section 23 determines the road surface reaction force F without the use of vehicle speed information.

In accordance with this embodiment, as described above, the reaction force from the road surface is determined without the use of the vehicle speed information, and the target electric current value is determined on reflection of the road surface reaction force. This obviates the need for the provision of the input interface for the vehicle speed sensor, thereby reducing the costs of the electric power steering system. The road surface reaction force F computed by the road surface reaction force computing section 23 has a value reflecting the road surface conditions and the motor vehicle traveling conditions. Therefore, the steering operation can properly be performed while an appropriate steering counter force is applied to the driver via the steering wheel 2 irrespective of the friction coefficient of the road surface and the motor vehicle traveling conditions. Thus, a good steering feeling can be provided in any traveling states.

Further, the steering feeling can be set in accordance with a driver's preference by means of the reaction force characteristic setting section 30. That is, where the band pass characteristic of the filtering section 24 is set so that the gain is increased in all the frequency bands, for example, a steering feeling with a smaller reaction force can be provided. Such a steering feeling is preferred, for example, by female drivers. Where the band pass characteristic of the filtering section 24 is set so as to pass a fraction of the road surface reaction force F only in the intermediate frequency band, a steering feeling preferred by ordinary male drivers can be provided. Where the band pass characteristic of the filtering section 24 and the gain of the amplifier 26 are adjusted so that the gain is reduced in all the frequency bands, a heavy steering feeling preferred by young drivers can be provided. In this case, the output gain of the road surface reaction force computing section 23 is increased only during low speed traveling (e.g., parking), so that the driver can perform the steering operation without heaviness of the steering wheel for parking.

While the embodiment of the present invention has thus been described, the invention may be embodied in any other ways. Although the rotation angle $\theta_V$ of the output shaft 3B is detected in the embodiment described above, a potentiometer for detecting the displacement x of the rack shaft 5 transverse to the motor vehicle or a rotation sensor for detecting the rotational angle of the electric motor 13 may be employed as the steering angle sensor.

Options of the band pass characteristic to be set by the reaction force characteristic setting section 30 are not limited to those described above. The setting operation member of the reaction force characteristic setting section 30 may be a switch for switching between a plurality of frequency band characteristics of the filtering section 24, or may be of a graphic equalizer type which is capable of adjusting a gain for each of a plurality of frequency bands.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2000-363121 filed to the Japanese Patent Office on Nov. 29, 2000, the disclosure thereof being incorporated herein by reference.

What is claimed is:

1. An electric power steering system which employs an electric motor as a driving source to apply a steering assist force to a steering mechanism, the electric power steering system comprising:
   an operation degree detecting section for detecting an operation degree of an operation member for steering;
   a motor current detecting section for detecting an electric current flowing through the electric motor;
   a steering angle detecting section for detecting a steering angle of the steering mechanism;
   a reaction force computing section for computing a reaction force from a road surface on the basis of outputs of the operation degree detecting section, the motor current detecting section and the steering angle detecting section;
   a target value setting section for determining a driving target value for driving the electric motor on the basis of the operation degree detected by the operation degree detecting section and the reaction force computed by the reaction force computing section;
   a motor controlling section for controlling the electric motor for driving thereof on the basis of the driving target value determined by the target value setting section and the output of the motor current detecting section; and
   a road surface reaction force adjusting section for variably setting a degree of contribution of the reaction force computed by the reaction force computing section to the driving target value to adjust a magnitude of the road surface reaction force to be received by a driver from the operation member,
   wherein the road surface reaction force adjusting section includes a setting operation member which is operable by the driver, the variable setting of the degree of contribution of the reaction force to the driving target value being responsive to the operation of the setting operation member by the driver.

2. An electric power steering system as set forth in claim 1, wherein the operation degree detecting section comprises a torque sensor for detecting a steering torque applied to the operation member.

3. An electric power steering system as set forth in claim 1, wherein the road surface reaction force adjusting section further comprises a filtering section having a band pass characteristic to be adjusted by operating the setting operation member for selectively passing outputs of the reaction force computing section.

4. An electric power steering system as set forth in claim 3, wherein the road surface reaction force adjusting section further comprises gain adjusting means for adjusting an output gain of the reaction force computing section.

5. An electric power steering system as set forth in claim 1, wherein the road surface reaction force adjusting section further comprises a gain adjusting section for adjusting an output gain of the reaction force computing section in accordance with a setting by the setting operation member.

* * * * *